3,386,944
WATER BINDING AGENTS FOR POLYURETHANES BASED ON MIXTURES OF PHOSPHOROUS PENTOXIDE WITH PIGMENTS OR FILLERS
Friedrich Blomeyer, Cologne-Stammheim, Germany, assignor to Farbenfabriken Bayer Aktiengesellschaft, Leverkusen, Germany, a corporation of Germany
No Drawing. Filed Sept. 10, 1965, Ser. No. 486,537
Claims priority, application Germany, Sept. 18, 1964, F 44,008
12 Claims. (Cl. 260—37)

ABSTRACT OF THE DISCLOSURE

Water binding agents which are mixtures of phosphorous pentoxide and a pigment or filler such as zinc oxide, aluminum oxide, silicic acid, magnesium oxide or calcium oxide. The water binding agents are used to dry the components of polyurethanes including coating compositions based on organic polyisocyanates and active hydrogen containing compounds.

---

This invention relates to the preparation of polyurethanes, and more particularly, to a novel water-binding agent to be used in the preparation of polyurethanes.

Polyurethane lacquer mixtures which dry in the air consist of two components which are usually dissolved in solvents and contain free isocyanate and free hydroxyl groups. The two components which are kept separately, hence the name two-component lacquer, are only brought together shortly before the polyurethane is prepared. However, the component which contains hydroxyl groups is unstable upon storage, and the only way to achieve storage stability for the active hydrogen containing component is to triturate it with pigments and fillers by the method customarily used in the varnishing industry. As a consequence, where highly pigmented materials must be used, unfavorable mixing ratios result between the dissolved polyhydroxyl compound, which is charged with pigment and fillers, and the dissolved polyisocyanate compound. Further, the different viscosities of the two components of the polyurethane reaction mixture make uniform mixing of the components even more difficult if not impossible. Alternatively, the component which contains free isocyanato groups may be pigmented but such an expedient is only possible when completely dry pigments and fillers are used and moisture is completely excluded since the isocyanate will react with any moisture present to form a urea.

Polyurethane products which are non-cellular and bubble free and which dry in the air and are solvent-free can be obtained from liquid polyisocyanates and liquid polyvalent compounds containing free hydroxyl groups if water binding agents are included in the reaction mixture to prevent the isocyanate/water reaction. Water binding agents also facilitate the production of moisture drying, one-component polyurethane lacquers containing free isocyanato groups which are stable in storage and which are obtained by reacting low molecular weight polyisocyanates and polyhydroxyl compounds. The formation of a film of lacquer from these one-component systems proceeds with the aid of atmospheric moisture by way of the isocyanate-water reaction with the formation of urea groups.

Sodium aluminosilicates of a certain structure are known as water binding agents and act like a molecular screen taking up water and binding it by absorption. These silicates have gained importance especially in the production of polyurethanes from two-component systems without the use of solvents.

In addition, metal oxides, especially alkaline earth oxides, metal halides such as magnesium halide, aluminum chloride and metal hydrides such as magnesium hydride and lithium aluminum anhydride are also known for their utility as chemical water binding agents in the preparation of polyurethane materials which are non-cellular and bubble-free. Orthoformic acid alkyl esters, trichlorotriethylphosphite, aluminum alcoholates, titanic acid esters and orthosilicic acid tetraalkyl esters have also been used as chemical water binding agents for liquid or pasty polyurethane materials prepared from two-component systems and for moisture drying one-component polyurethane lacquer systems.

A serious disadvantage is encountered in the use of the foregoing materials as water binding agents, however, since they have a narrow but varying range of activity. As a rule, they have no stabilizing effect on polyurethane materials or varnishes if the moisture content of pigment and filler and any solvent present is more than 1%. Moreover, they do not permit pigmentation of the polyisocyanate components by the simple processes generally employed for so doing.

It is therefore an object of this invention to provide a water binding agent for use in the preparation of polyurethanes which is devoid of the foregoing disadvantages.

It is a further object of this invention to provide a method for stabilizing polyurethanes against the effects of moisture by means of a water binding agent effective for liquid or pasty, solvent-free or solvent-containing polyurethane materials.

Another object of this invention is to provide a water binding agent which is non-caking and efficient even when the concentration of water present in the components of the reaction mixture exceeds 1%.

Still another object of this invention is to provide a method for producing zinc dust dyes based on one-component, moisture drying polyurethane lacquers which are stable against the effects of water in storage.

Yet another object of this invention is to provide a water binding agent for the preparation of polyurethanes stabilized against moisture which permits the polyurethane reactants to have substantially the same viscosity so that the mixing operation is facilitated and the mixing ratios are simplified in two-component systems.

The foregoing objects and others which will become apparent from the following description are accomplished in accordance with this invention, generally speaking, by stabilizing the reaction mixture of an organic polyisocyanate and an active hydrogen cointaining compound against the effects of water with an effective amount of a mixture of phosphorous pentoxide and a pigment and/or filler as a water binding agent. More specifically, the preferred pigments and/or fillers to be used with phosphorous pentoxide, as more fully explained hereinafter, are zinc oxide, aluminum oxide, silicic acids, magnesium oxide and calcium oxide.

Although phosphorous pentoxide is one of the most powerful dehydrating agents known in chemistry, it is completely unexpected that it could be used for the stabilization of polyurethane reaction mixtures or the components thereof against the influence of water. The main reason for this seeming contradiction resides in the fact that in the presence of organic solvents as well as polyesters or polyether alcohols, phosphorous pentoxide cakes together and glassy deposits are formed on the walls of the vessel which cannot be stirred away. Further, the phosphorous pentoxide which has become caked is soon covered with a film of phosphoric acids which impart a definite acidity to the reaction mixture detrimental to the proper formulation of polyurethanes in general. In addition, after the surface of the phosphorous pentoxide becomes wet with a layer of the acid solution, its drying power is much less than that of the solid oxide and this, together with its corrosive nature and the difficulty of handling it, precluded its use in most industrial applications. It is quite surprising, therefore, to find that this dehydrating agent, which has previously been thought to be entirely useless in the preparation of polyurethanes, can now be used in their manufacture when mixed with pigments and/or fillers.

The pigment and/or fillers to be used in admixture with the phosphorous pentoxide prevent the oxide from caking after its reaction with water and should have a high absorption capacity both for the phosphorous pentoxide and the reaction products of the latter with water. The most effective are those pigments and/or fillers which are used for chromatographic purposes since they have a high absorption capacity. Especially suitable are finely dispersed zinc oxide and chromatographic grade aluminum oxide, although less surface active pigments and/or fillers such as precipitated zinc oxide, colloidally dispersed silicic acids, normal magnesium oxide, calcium oxide and aluminum oxide may also be mixed with phosphorous pentoxide to form effective non-caking water binding mixtures.

Now, for the first time with the use of the water binding mixtures of this invention, it is possible to produce zinc dust dyes based on moisture drying one-component polyurethane lacquers which are stable in storage. Further, these mixtures permit the trituration of polyisocyanates and prepolymers thereof by the usual processes without fear of reaction between the NCO group and the moisture of the air. The mixing ratios as well as the mixing operation in the production of two-component systems is simplified due to the fact that the components of the polyurethane reaction mixture have substantially the same viscosity. Further, the presence of phosphorous pentoxide has the effect of enhancing the adhesion of polyurethane primers containing zinc chromate, lead chromate and zinc dust. The same improvement in quality is found in corresponding combinations of polyisocyanates and polyhydroxyl compounds with coal tar.

The polyurethanes prepared according to the method of this invention may be air drying as well as moisture drying materials and they may be used in thin or thick layers, with or without solvent, in a liquid or pasty form and they may be either clear or pigmented. Thus, the water binding agent of this invention is suitable for use in the preparation of all types of polyurethanes and relates both to one-component and to two-component systems.

The water binding mixtures of the invention may be incorporated into the polyurethane being prepared in several different ways. For example, the water binding mixtures used for drying the solvents or the liquid or solution form of the polyhydroxyl compound can be incorporated therein by stirring it in by hand. After prolonged standing, the water-binding agent precipitates so that the solvent, the solution or the liquid polyhydroxyl compound can be separated by filtration or decantation and used for the production of stable, clear one-component lacquers or solvent-free polyurethane materials which are non-cellular and bubble-free. Pigmented materials or lacquers are produced by first mixing the water binding mixture with a mixture of pigment and filler and then triturating the resulting mixture with the liquid or dissolved polyhydroxyl compound or the liquid or dissolved polyisocyanate.

Another means for incorporating the water binding mixture into a polyurethane reaction mixture consists of first thoroughly mixing the pigment/filler mixture with the liquid or dissolved polyhydroxyl compound and adding the water-binding mixture only shortly before trituration and stirring it into the mixture. Moisture-drying, one-component zinc dust paints are produced by mixing the water binding mixture with small quantities of zinc oxide and then triturating it either with the dissolved polyhydroxyl compounds or with the finished, clear one-component lacquer. The zinc dust is then stirred into the resulting mixture and the triturated polyhydroxyl compound is then reacted with the polyisocyanate.

In another method of the invention, the water binding mixture of the invention is ground with the dissolved polyhydroxyl compound in a ball mill; zinc dust and polyisocyanate may be then added in any desired sequence. According to another method for producing one-component zinc dust paints, the water binding mixture of this invention is first mixed with the zinc dust and the resulting mixture is stirred into the finished, clear one-component lacquer.

An anhydrous matting paste for matting one- and two-component lacquers can be produced by grinding colloidally dispersed silicic acids with solvents and about 6% of the water binding mixture. Any of the usual apparatuses such as, for example, high speed stirrers, kneaders, one-roller or three-roller mills, ball mills or sand mills can be used for the trituration and grinding processes of the foregoing procedures.

The ratio of phosphorous pentoxide to pigment and/or filler may vary greatly and depends on the purpose for which the mixture is to be used and the method of production of the polyurethane material. As an illustration, for the complete drying of solvents or solutions of polyhydroxyl compounds followed by separation of the drying agent by decanting or filtration, mixtures of phosphorous pentoxide with, for example, zinc oxide, magnesium oxide, calcium oxide, aluminum oxide and colloidally dispersed silicic acids in the ratios ranging from 3:7 to 1:1 are especially suitable. If the water-binding mixture is to remain in the lacquer and to be triturated with a pigment/filler mixture by the usual processes, the most favorable results are obtained with a binding agent consisting of a mixture of phosphorous pentoxide with a chromatographic grade aluminum oxide in a ratio of 3:7. This mixture can be readily triturated and produces no lubricating effect in the trituration apparatus. The water binding mixtures do not attack the apparatus in which they are being used and they do not cake on exposure to atmospheric moisture. Furthermore, after the reaction with water has been completed, none of the water binding mixtures of this invention impart an acid pH to the polyurethane materials or lacquers in which they are being used so that stable zinc dust dyes can be produced with them and it is safe to pack mixtures containing these materials in metallic containers.

The quantity of the water binding mixture to be used depends on the water content of the polyurethane material or lacquer and is calculated on the following basic equation:

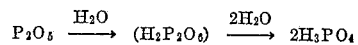

$$P_2O_5 \xrightarrow{H_2O} (H_2P_2O_6) \xrightarrow{2H_2O} 2H_3PO_4$$

Therefore, to bind 1 gram of water, about 2.7 grams of phosphorous pentoxide are required. With such small proportions, acidity might possibly occur in the reaction mixture so that it is advantageous to use an excess of the water binding mixture of up to about 8 grams per gram of water, calculated for the stage of the metaphosphoric acid. In practical experiments, quantities of from about 1.2 to about 2.4% pentoxide calculated on the usual commercial pigments and fillers to be dehydrated gave the best results. Too large an excess of the water binding mixture should be avoided in solvent-free two-component polyurethane materials since the phosphoric acid produced in such an instance may migrate out to the surface of the lacquer film, coating or filter composition.

Any suitable polyisocyanate may be used in the production of polyurethanes according to the invention and all of them are contemplated. Some such suitable polyisocyanates are listed in Annalen 562,475 (1949) including polymethylene diisocyanates such as tetramethylene diisocyanate and hexamethylene diisocyanate; aliphatic diisocyanates with built-in aromatic or hydroaromatic ring systems such as ω,ω'-diisocyanate-1,3-dimethylbenzene, 1,4 - diisocyanate - hexahydrobenzene, cis-1,4-diisocyanate hexahydrobenzene and dicyclohexylmethane-4,4'-diisocyanate; mixed aromatic-aliphatic diisocyanates such as 3-phenyl-isocyanate-1-ethylisocyanate; diisocyanates of benzene and its homologues such as commercial toluylene diisocyanate mixtures and 2,4-toluylene diisocyanate and derivatives thereof chlorinated in the benzene nucleus, commercial and pure diphenylmethane-4,4'-diisocyanate, 3,3'-dimethyldiphenylmethane-4,4'-diisocyanate, diphenyldimethylmethane - 4,4' - diisocyanate, 1,1-diphenyl-cyclohexyl - 4,4"-diisocyanate, 1-methylbenzyl-2,4,6-triisocyanate, 1,3,5-trimethylbenzyl-2,4,6-triisocyanate, naphthalene-1,3,7 - triisocyanate, diphenylmethane-2,4,4-triisocyanate, 3-methyldiphenylmethane-4,6,4'-triisocyanate, 4,4'-dimethyldiphenylmethane-2,2',5,5' - tetraisocynanate and triphenylmethane-4,4',4"-triisocyanate.

Instead of the simple polyisocyanates, reaction products of an excess of a polyisocyanate, usually a diisocyanate, with compounds containing reactive hydrogen atoms may be used. Some examples of such preadducts or prepolymers are those obtained from the reaction of an excess of any suitable polyisocyanate but preferably hexamethylene diisocyanate, toluylene diisocyanate or diphenyl methane diisocyanate with polyhydric alcohols such as ethylene glycol, diethylene glycol, butylene glycol, glycerol, trimethylolpropane, hexanetriol, polypropylene glycol, polyethylene glycol, alkoxylation products of these polyhydric alcohols as well as castor oil, polyesters containing hydroxyl groups and preadducts obtained from natural oils and fats which have been subjected to alcoholysis or mixtures of the foregoing.

Polyvalent polyisocyanates which have been produced from polyvalent isocyanates, preferably diisocyanates, and small quantities of water with biuret formation may also be used. Thus, for example, a biuret triisocyanate obtained from three mols of hexamethylene diisocyanate and one mol of water and similar biuret polyisocyanates are suitable in the practice of this invention. Carbodiimides having free terminal isocyanate groups and prepared from polyisocyanates with catalysts such as phosphine oxides may also be used in the practice of this invention, as well as polyvalent polyisocyanates obtained by di- or trimerization of diisocyanates. Polyisocyanates obtained by the reaction between an excess of diisocyanate with a polybasic carboxylic acid are also suitable. Further, mixtures of any of the above-enumerated polyisocyanates with one another may also be used.

Any suitable organic compound containing at least two active hydrogen containing groups as determined by the Zerewitinoff method may be used to react with isocyanates in the preparation of a polyurethane. Generally speaking, any compound having an active hydrogen atom which will react with an —NCO group may be used. Some suitable polyhydroxyl compounds which may be used for the production of polyurethane materials or lacquers are, for example, any suitable hydroxyl polyester including lactone polyesters, such as, for example, those obtained from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,1-heptane diol, glycerine, trimethylolpropane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth herein or they may be made using the same components that make up the hydroxyl polyester with only a portion of the components being a diamine such as ethylene diamine and the like.

Any suitable polyhydric polyalkylene ether may be used such as, for example, the condensation product of an alkylene oxide beginning with any suitable initiator. The initiator may be a difunctional compound, including water, so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator, including as such amines, alcohols and the like, have from 2 to 8 active sites to which the alkylene oxides may add. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms and the like. Phosphorous acids may also be used as initiators, but the phosphorous compounds are somewhat peculiar and require a different mode of preparation, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many suitable processes for the preparation of polyhydric polyalkylene ethers including U.S. Patents 1,922,459, 3,009,939 and 3,061,625 or by the process disclosed by Wurtz in 1859 and discussed in the Encyclopedia of Chemical Technology, Volume 7, p. 257 to 262, published by Interscience Publishers, Inc. (1951).

Specific examples of initiators are water, ethylene glycol, propylene glycol, glycerine, trimethylol propane, pentaerythritol, arabitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p"-triphenylmethane triamine, ethylene diamine, propylene diamine, propylene triamine, N,N,N',N'-tetrakis-(2-hydroxypropyl)-ethylene diamine, diethylene triamine and the like.

Any suitable polyhydric polythioether may be used such as, for example, the condensation product of thiodiglycol or the reaction product of a polyhydric alcohol, such as are disclosed herein for the preparation of the hydroxyl polyesters, with any other suitable thioether-glycol. Other suitable polyhydric polythioethers are disclosed in U.S. Patents 2,862,972 and 2,900,368.

Any suitable polyacetal may be used such as, for example, the reaction product of formaldehyde or any other suitable aldehyde with a polyhydric alcohol such as those disclosed herein for the preparation of the hydroxyl polyesters.

Any suitable aliphatic polyol may be used such as, for example, alkane diols including, for example, ethylene butylene glycol, 1,3-butylene glycol, 1,5-pentane diol, 1,4-butylene glycol, 1,3-butylene glycol, 1,5-pentane diol, 1,4- butane diol, 1,3-pentane diol, 1,6-hexane diol, 1,7-heptane diol, 2,2-dimethyl-1,3-propane diol, 1,8-octane diol, 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any silicone resins which contain free hydroxyl groups such as, for example, siloxane-oxyalkylene block copolymers represented by the formula

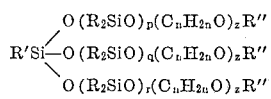

wherein R and R' are organic radicals, either aliphatic, aromatic or cycloaliphatic, having from 1 to 8 carbon atoms which may or may not contain one or more functional groups and, in addition, may be halogen substituted; R'' is hydrogen or an organic radical, either aliphatic, cycloaliphatic, or aromatic, having from 1 to 8 carbon atoms which may or may not contain one or more functional groups and may be halogen substituted; $p$, $q$ and $r$ each have a value of from 2 to 15 and $(C_nH_{2n}O)_z$ is a polyoxyalkylene block, such as, for example, a polyoxyethylene, polyoxypropylene or polyoxybutylene block containing from 10 to 50 oxyalkylene units, may also be used as polyhydroxy compounds. In the above formula $(C_nH_{2n}O)_z$ is preferably a mixture of polyoxyethylene and oxypropylene units containing from 17 to 19 oxyethylene units and 11 to 15 oxypropylene units. Preferably, $p$, $q$ and $r$ each have a value of six. Preferably, the siloxane-oxyalkylene block copolymer has at least two and seldom more than four functional groups, such as, for example, —OH, —NHR, —CONHR, and/or —COOH groups wherein R is hydrogen or a hydrocarbon radical, such as, methyl, ethyl, phenyl or the like. Phenol-formaldehyde condensates as well as addition products of alkylene oxides and ammonia, amines or hydrazines such as triethanolamine, triisopropanolamine and the like may be used as well as polycarbonates having free hydroxyl groups.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including, for example, aromatic polyamines such as p-amino aniline, 1,5-diaminonaphthalene, 2,4-diamino toluene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethylene triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole and the like.

Some useful compounds having predominantly secondary hydroxyl groups are castor oil, brominated or hydrogenated castor oil, reaction products of castor oil with polyhydric alcohols, octadecene-9-diol-1,12, polyether alcohols from propylene oxide and polyhydric alcohols or amines of hydrazine or ammonia, epoxy resins produced from polyhydric alcohols or phenols with epichlorohydrin in alkaline solution.

Mixtures of any of the compounds of any of the classes set forth hereinbefore may be used and such compounds may also contain other substituents including halogen atoms such as, for example, chloro, bromo, iodo and the like; nitro groups; alkoxy radicals such as, for example, methoxy, ethoxy, propoxy, butoxy and the like; carboalkoxy groups such as, for example, carbomethoxy, carbethoxy and the like; dialkyl amino groups such as, for example, dimethyl amino, dipropyl amino, methylethyl amino and the like; mercapto, carbonyl, thiocarbonyl, phosphoryl, phosphato and the like groups. It is to be understood that in reacting with NCO groups, hydroxyl groups will yield urethane linkages whereas carboxylic acids yield amide linkages and amines yield ureas, and that in the preparation of a polyurethane, active hydrogen containing compounds are contemplated which may contain as active hydrogen containing groups —OH, —NH$_2$, —NH, —COOH and the like, among others.

The NCO:OH ratio of liquid or soluble prepolymers formed in the preparation of polyurethane materials or lacquers by the one-component process is preferably about 2.0 to 2.2. If diisocyanates and polyhydroxyl compounds are used, which are substantially bifunctional and linear, soluble polymers may still be formed if the NCO:OH ratio is not more than about 1.4.

However, if trivalent isocyanates or isocyanates of higher valency are used, the NCO:OH ratio may be as high as 5:1 to about 40:1 and a soluble prepolymer is still obtained. Moisture-drying one-component polyurethane lacquers, for example, are obtained by a reaction between an excess of a low molecular weight polyisocyanate and a polyhydroxyl compound. The reaction product which has free isocyanate groups and which is still liquid or soluble when the reaction has proceeded to completion with the exclusion of moisture may then be cured in the presence of moisture in which case the NCO groups form urea linkages with water.

The NCO:OH ratio to be used in the preparation of polyurethane materials or lacquers obtained from polyisocyanates and polyhydroxyl compounds by the two-component process may vary within wide limits depending on the product desired, the degree of branching of the reaction components and the extent of pigmentation desired, but it will generally be from about 0.5:1 to about 1.4:1. In the manufacture of polyurethanes from a two component system, the polyhydroxyl compound and the polyisocyanate are brought together only shortly before the polyurethane is to be prepared and mixed thoroughly. If the polyurethane to be prepared from the two-component system is to be solvent-free, only liquid polyisocyanates or polyisocyanates dissolved in plasticizers and liquid polyhydroxyl compounds or polyhydroxyl compounds dissolved in polyhydric alcohols are suitable. On the other hand, if the two-component system contains a solvent, practically any polyisocyanates and polyhydroxyl compounds are suitable.

Almost any of the pigments and fillers used in practice are suitable for use in the preparation of the polyurethanes of this invention. Caution should be exercised however, since alkaline pigments may catalyze the NCO/OH addition reaction and shorten the times which may be used for the preparation of polyurethane materials or lacquers by the two-component process. It is to be noted, however, that stable one-component polyurethane lacquers or polyurethane materials free from foam and bubbles are obtained even when the pigment and filler used have a high moisture content if the water binding agent of this invention is employed; further, water-containing colloidally dispersed silicic acids can be used without risk. The drying power of the water binding mixture of this invention is so strong that polyisocyanates or prepolymers can be triturated with pigments and fillers and mixed with zinc dust with no adverse effect due to reaction with water.

The amount of pigmentation and filling depends on the method of preparation and the purpose for which the product is to be used, and may be as high as 600% or more. For example, in the preparation of a solvent-containing ground lacquer or covering lacquer, it is usual to choose an amount of pigment and/or filler of from about 140 to 200% and 50% respectively, calculated on the amount of solid binder. Some suitable fillers which may be used are sand, chalk, barite, talcum and the like. Further, compatible substances which dissolve in the polyisocyanate, the polyhydroxyl compound or the prepolymer, or solvent solutions thereof may be added. Some such suitable substances include, for example, resins, coal tars and natural or synthetic asphalt.

Any suitable solvent for the polyurethane materials or lacquers which is preferably anhydrous for two-component systems may be used in the preparation of polyurethane lacquers. Suitable solvents which may contain water may also be used since they can be dried by means of the water-binding mixtures defined by this invention. Some such suitable solvents that can be used advantageously are, for example, esters such as methoxybutylacetate, ethyl glycol acetate, methyl glycol acetate, butyl acetate, ethyl acetate; ketones such as cyclohexanone, methyl isobutylketone, methyl ethyl ketone; halogenated hydrocarbons such as methylene chloride, trichloroethylene; aromatic compounds such as xylene and toulene and the usual commercial solvent mixtures of petroleum chemistry which contain mainly aromatic compounds and the like. Ordinarily, however, it is customary to use mixtures of solvents.

The binder contents, calculated on the total amount of lacquer including solvent, are 40 to 50% for painting lacquers by the one- and two-component process; 80 to 95% for casting and foundation materials applied by the one- and two-component processes, and 30 to 45% for spraying lacquers applied by the one- and two-component processes.

Agents which help to level the surface, such as cellulose esters or ethers, polyvinyl acetate, polyvinyl butyral and silicone oils as well as agents which increase the viscosity, such as nitrocellulose, polyvinyl butyral, hydrogenated castor oil, copolymers of vinyl acetate and vinyl chloride may be included provided they are compatible. To improve the gloss and the permanence of the gloss, additions of chlorinated di- or terphenyl, for example, may be used, and in order to prevent bubbles in painting lacquers, copolymers of acrylic acid esters and vinyl ethers may be used as well as synthetic plasticizers which improve the elasticity and adhesion of the final product.

The polyurethane materials or lacquers produced with the noncaking mixtures of phosphorous pentoxide and pigments and/or fillers as water binding agents are suitable for the production of floor coating compositions, acid and alkali-resistant linings, casting resins, synthetic resin compositions, rubber-like elastomers, joint fillers, coatings that are stable under water, welding paints and corrosion protection paints. Chemical resistance and good abrasion resistance make one- and two-component lacquers suitable for painting floors and containers made of wood, metal and concrete.

The application of the polyurethane materials or lacquers can be carried out by any suitable process such as painting, spraying, casting, applying with a trowel or rolling, the choice of method being limited only by the product desired and the pot life of the polyurethane, especially where solvent-free two-component systems are employed.

The invention is further illustrated but is not intended to be limited by the following examples in which all parts and percentages are by weight unless otherwise specified.

Example 1

About 15.7 parts of quartz powder, about 53 parts of quartz sand, about 5.7 parts of manganese blue and about 5 parts of a mixture of phosphorous pentoxide and aluminum oxide in the ratio of 3:7 are incorporated by means of a kneader into a mixture of about 6.5 parts of castor oil and about 7.9 parts of a propoxylated trimethylol propane (OH number 379). Shortly before working up, about 11.2 parts of commercial, liquid 4,4'-diphenylmethane diisocyanate are added to the resulting composition with thorough stirring.

The polyurethane material obtained can be applied directly by the casting or doctoring process, e.g., as floor coating composition, on iron and dries without formation of bubbles. The pot life is about 15 minutes.

Example 2

About 210 parts of calcium carbonate, about 5 parts of a gelling agent made of bentonite or montmorillonite (prepared with organic bases by cation exchange reaction), about 90 parts of titanium dioxide (rutile) which has not been after-treated and about 35 parts of a mixture of phosphorous pentoxide and aluminum oxide as used for chromatographic purposes in the ratio of 3:7 are mixed in the dry state and triturated in a cone mill with about a 75% solution of a polyisocyanate prepared from about 3 mols of toluylene diisocyanate and about 1 mol of trimethylolpropane in ethyl acetate and about 30 parts of a solvent combination consisting of ethyl glycol acetate, butyl acetate and xylene in the ratio of 3:1:2. The trituration product obtained is stable in storage and is used as Component I in the two-component process.

Component II is a trituration of about 40 parts of castor oil, about 70 parts of a linear polypropylene glycol (molecular weight 1000, OH number 115), about 290 parts of calcium carbonate, about 100 parts of baryte, about 5 parts of the above mentioned gelling agent, about 15 parts of a 10% solution of dibutyl tin dilaurate in ethyl acetate and about 50 parts of a solvent combination consisting of ethyl glycol acetate, butyl acetate and xylene in the ratio of 3:1:2.

Component I and Component II can easily be mixed in equal parts by weight (by volume) without being highly sensitive to errors in dosing. Careful mixing can easily be controlled by the different coloring of Components I and II.

Example 3

About 175 parts of chrome yellow, about 75 parts of talcum and about 15 parts of a mixture of phosphorous pentoxide and aluminum oxide as used for chromatographic purposes in a ratio of 3:7 are mixed and then stirred into a solution consisting of about 100 parts of a polyester of trimethylolpropane, butanediol and adipic acid (OH number 215), about 1 part of cellulose acetobutyrate, about 45 parts of ethyl glycol acetate, about 34 parts of butyl acetate, about 18 parts of ethyl acetate, about 35 parts of toluene and about 25 parts of xylene and triturated in a ball mill. Shortly before working up, about 90 parts of about a 75% solution of a polyisocyanate prepared from about 3 mols of toluylene diisocyanate and about 1 mol of trimethylolpropane are added and thoroughly stirred by hand. A corrosion protective primer with improved adhesion to metal is obtained.

Example 4

(a) Phosphorous pentoxide:zinc oxide _____ 5:5
(b) Phosphorous pentoxide:zinc oxide _____ 3:7
(c) Phosphorous pentoxide:magnesium oxide _____ 3:7
(d) Phosphorous pentoxide: aluminum oxide _____ 5:5
(e) Phosphorous pentoxide:aluminum oxide _____ 3:7
(f) Phosphorous pentoxide: colloidally dispersed silicic acid _____ 5:5

(Mixtures (d) to (f) contain precipitated and dried aluminum oxide or aluminum oxide suitable for chromatographic purposes or dried silicic acid or silicic acid suitable for chromatographic purposes.)

About 2000 parts of a solvent mixture of ethylene glycol, butyl acetate and xylene in the ratio of 3:1:2 are adjusted to a water content of about 1% with about a 10% solution of water in methyl glycol acetate.

About 20 parts of mixtures (a) to (f) are stirred into separate portions of about 200 parts of the resulting solvent mixture. After being left to stand for about one hour, the mixtures are filtered and the filter is not blocked in the process. The determination of water by the Karl Fischer method carried out following the filtration showed a water content of about 0.05%.

Portions of about 36 parts of cellulose acetobutyrate are each dissolved in about 712 parts of (a) the solvent combination treated with mixtures of phosphorous pentoxide and pigment or filler and (b) the untreated solvent combination of Example 4. Into solutions (a) and (b) are added successively in each case about 720 parts of a polyester of diethylene glycol and adipic acid (1.3% OH) and about 1440 parts of a polyisocyanate prepared from about 3 mols of toluylene diisocyanate and about 1 mol of trimethylolpropane (at a concentration of about 75% dissolved in ethyl acetate), with stirring. One-component polyurethane lacquers are formed in solution, having a solids content of about 62% each. The ratio of NCO:OH in the production of the lacquers is about 8:1. The lacquer with solvent combination (a) is still perfectly satisfactory for use after 12 months whereas the lacquer with solvent combination (b) exerts a noticeable pressure on the walls of the container after a few days, due to the isocyanate-water reaction. On opening the container, the onset of gelation is observed.

Example 5

Portions of about 36 parts of cellulose acetobutyrate and about 720 parts of a linear polypropylene glycol (molecular weight 2000, OH number 61) are dissolved in about 712 parts of a solvent combination with a definite water content as in Example 4. In each case, the mixtures of phosphorous pentoxide and pigment or filler mentioned in Example 4 in quantities of about 10 parts are added to about 100 grams of solution with stirring after which these mixtures are deposited in a short time at the bottom of the container. The top layer is then decanted. Determination of water by the Karl Fischer method gave contents of about 0.04 to about 0.06%.

To each about 1470 parts of (a) dried and (b) undried solutions, about 1440 parts of a polyisocyanate prepared from about 3 mols of toluylene diisocyanate and about 1 mol of trimethylolpropane (at a concentration of about 75% in ethyl acetate) are added with stirring. One-component polyurethane lacquers are formed in solution with a solids content of about 62% each. The ratio of NCO:OH in the production of the lacquers is about 6.2. Lacquer (a) can still be used perfectly satisfactorily after one year whereas lacquer (b) shows the onset of gelation after only a short time.

Example 6

About 230 parts of zinc chromate, about 50 parts of microtalcum, about 80 parts of microasbestos, about 40 parts of the same gelling agent as used in Example 2 and about 20 parts of a mixture of about 3 parts of phosphorous pentoxide and about 7 parts of aluminum oxide (chromatographic grade) are mixed together dry, stirred into a solution of a polyester of diethylene glycol and adipic acid (1.3% OH) in a solvent mixture consisting of about 50 parts of ethyl glycol acetate, about 17 parts of butyl acetate, about 33 parts of xylene, about 20 parts of methoxy butyl acetate and about 25 parts of orthoformic acid ethyl ester and triturated in a cone mill. To this are added in the given sequence, with vigorous stirring, about 230 parts of about a 67% solution of a polyisocyanate prepared from about 3 mols of toluylene diisocyanate and 1 mol of trimethylolpropane in a 1:1 mixture of ethyl glycol acetate and xylene, about 20 parts of about a 10% solution of cellulose acetobutyrate in ethyl glycol acetate and about 1 part of about a 10% solution of a copolymer of acrylic acid ester with vinyl ethers in ethyl acetate. The mixture is stable in air-tight containers, and the lacquer obtained can be sprayed onto vertical walls so that the thickness of the dry film may be as high as about 100μ.

The lacquer possesses a very good adhesion to metal surfaces which is considerably better than that of lacquers which do not contain the mixture of phosphorous pentoxide and aluminum oxide. Further, lacquers containing the phosphorous pentoxide/aluminum oxide mixtures showed correspondingly better properties over those which did not in the salt spray test. When the phosphorous pentoxide mixture according to the invention is replaced by other water binding agents such as orthoformic acid esters, sodium aluminosilicates or calcium oxide, no stable lacquers are obtained even if large quantities of these drying agents are used.

Example 7

About 30 parts of a mixture of phosphorous pentoxide and aluminum oxide as used for chromatographic purposes in the ratio of 3:7 are mixed dry with about 20 parts of zinc oxide. The resulting mixture is then triturated with about 25 parts of a linear polypropylene glycol (molecular weight 2000, OH number 61) on a one-roller mill. About 40 parts of a solvent mixture consisting of ethyl glycol acetate, butyl acetate and xylene in the ratio of about 3:1:2, about 15 parts of orthoformic acid ethyl ester and about 58 parts of about a 67% solution of a polyisocyanate prepared from about 3 mols of toluylene diisocyanate and about 1 mol of trimethylolpropane in a 1:1 mixture of ethyl glycol acetate and xylene is added to the resulting mixture with stirring. Following this, about 5 parts of about a 10% solution of cellulose acetobutyrate in ethyl glycol acetate and about 40 parts of about a 10% dispersion of a gelling agent as used in Example 2 in a 1:1 mixture of ethyl glycol acetate and xylene are added. Finally, about 500 parts of zinc dust are stirred into the mixture with a high speed stirrer. The stability in storage of the zinc dust paint is more than 4 weeks.

In a second experiment, a mixture of phosphorous pentoxide and calcium oxide in the ratio of about 3:7 was used instead of the mixture of phosphorous pentoxide and aluminum oxide, and trituration was carried out in the ball mill. The resulting zinc dust paint was still intact after one month's storage. The same preparation without the phosphorous pentoxide mixture of the invention or containing different quantities of calcium oxide instead of the phosphorous pentoxide mixtures (such as, for example 3, 5, 9 and 15 parts instead of 7 in the above preparation) has already gelled after two days.

The zinc dust paint with the drying mixture of the invention has improved adhesion to iron surfaces, has excellent resistance under water and can be welded.

Example 8

About 9 parts of colloidally dispersed silicic acid as used for matting purposes (water content about 4.4%) are mixed with about 0.81 part of a mixture of about 3 parts of phosphorous pentoxide and about 7 parts of aluminum oxide as used for chromatographic purposes and triturated in a cone mill with about 90 parts of a solvent combination of ethylene glycol acetate and xylene (1:1). The dried matting agents in a ratio of silicic acid to binder of about 1:10 to about 2:10 is stirred into a stable moisture drying one-component lacquer as in Example 4 or 5, and the moisture content is adjusted to about 50% with the dried solvent combination of Example 4. Stable, semi-glossy to matt finished lacquers are obtained which retain their effect even after several months' storage.

If the phosphorous pentoxide mixture of the invention is replaced by some other water binding agent, no stable moisture drying matt lacquer is obtained.

Example 9

About 240 parts of red iron oxide, about 130 parts of talcum and about 30 parts of a mixture of phosphorous pentoxide and aluminum oxide as used for chromatographic purposes in the ratio of about 3:7 are mixed dry and then triturated by the usual methods of the lacquer industry (cone mill, three-roller mill, one-roller mill, ball mill) with about 95 parts of a polyester of diethylene glycol and adipic acid (1.3% OH), about 45 parts of a mixture of about 10 parts of the gelling agent of Example 2 in about 90 parts of ethyl glycol acetate, about 40 parts of methoxybutyl acetate and about 200 parts of a solvent combination of ethyl glycol acetate, butyl acetate and xylene in the ratio of about 3:1:2.

To the resulting mixture are added in the given sequence, with stirring, about 230 parts of about a 67% solution of a polyisocyanate prepared from about 3 mols of toluylene diisocyanate and about 1 mol of trimethylolpropane in ethyl glycol acetate and xylene (1:1), about 30 parts of about a 20% solution of a polyvinylbutyral in ethyl glycol acetate and about 70 parts of about a 20% solution of a copolymer of vinyl chloride and vinyl acetate in ethyl glycol acetate/cyclohexanone in the ratio of about 3:1 (NCO:OH=8). The pigment content is about 140% and the solids content is in the region of about 56.5%. The lacquer produced is ready for painting after a reaction time of about 2 days and the stability in storage is more than one year. The lacquer can be adjusted to a suitable consistency for spraying and immersion by dilution with solvents.

Example 10

About 42 parts of titanium dioxide (rutile about 0.6% water) are mixed dry with about 4.5 parts of a mixture of phosphorous pentoxide and aluminum oxide as used for chromatographic purposes in the ratio of about 3:7. The mixture produced is triturated by the usual methods with about 24 parts of either (a) a polyester of diethylene glycol and adipic acid (1.3% OH) or (b) a linear polypropylene glycol (molecular weight 2000, OH number 61) and about 30 parts of a solvent combination consisting of ethyl glycol acetate, butyl acetate and xylene in the ratio of about 3:1:2. Following this, about 80 parts of about a 75% solution of a polyisocyanate having a biuret structure and obtained from about 3 mols of hexamethylene diisocyanate and about 1 mol of water (according to DBP 1 101 394) in ethyl glycol acetate an xylene (1:1), about 23 parts of about a 20% solution of a copolymer of vinyl chloride and vinyl acetate in ethyl glycol acetate/cyclohexanone in the ratio of about 3:1 and about 1.6 parts of about a 10% solution of a copolymer of acrylic acid butyl ester and vinyl isobutyl ether in toluene are added in the given sequence. The solids content is about 43% and the pigment content, calculated on the binder, is about 48%. The NCO:OH ratio is about 6.5 for (a) and about 12.5 for (b). The lacquer mixture, which is stable in storage for over 6 months, gives films that are fast to light and resistant to weathering.

Example 11

Road tar having a viscosity (measured in a road tar viscosimeter 10 mm. nozzle) of about 250 to 500 seconds is liquefied by heating and then added, with stirring, into hot xylene, in such proportions that an 80% solution results.

When cold, about 62.5 parts of the tar solution are thoroughly mixed in a kneader with about 27 parts of about an 80% solution of a polyether of degraded xylene formaldehyde resin, trimethylolpropane and the diepoxide of 4,4'-bispropoxy-diphenyl-dimethylmethane in ethyl glycol acetate (OH number 110 to 115), about 18 parts of about a 20% solution of a copolymer of vinyl chloride and vinyl acetate in ethyl glycol acetate and cyclohexanone in the ratio of 5:3, about 1 part of about a 10% solution of a copolymer of acrylic acid butyl ester and vinyl isobutyl ether in ethyl acetate, about 27 parts of about a 20% dispersion of hydrogenated castor oil in ethyl glycol acetate and xylene (1:1), about 50 parts of after-treated titanium dioxide (rutile), about 4.5 parts of a mixture of phosphorous pentoxide and aluminum oxide (3:11), about 5 parts of orthoformic acid ethyl ester, about 10 parts of xylene and about 4 parts of diacetone alcohol. Shortly before working up, about 36 parts of about a 67% solution of a polyisocyanate prepared from about 3 mols of toluylene diisocyanate and about 1 mol of trimethylolpropane in ethyl glycol acetate and xylene (1:1) are thoroughly stirred into the resulting composition. The lacquer obtained can be applied onto vertical surfaces in films that have a thickness of $100\mu$ when dry without the formation of bubbles. Drying appears to be slightly retarded by the inclusion of the phosphorous pentoxide mixture of the invention but the adhesion to the underlying surface is considerably improved.

Example 12

About 50 parts of quartz powder and about 10 parts of a mixture of phosphorous pentoxide and aluminum oxide as used for chromatographic purposes in the ratio of about 3:7 are mixed dry and stirred with a high speed stirrer into about 50 parts of tar which is liquid at normal temperature. Following this, about 20 parts of a polyester of ethylene glycol and phthalic acid anhydride (OH number 280) are worked in. Shortly before working up, about 33 parts of about a 75% solution of a polyisocyanate prepared from about 3 mols of toluylene diisocyanate and about 1 mol of trimethylol propane in ethyl acetate are added. The resulting composition has a pot life of about 45 minutes and dries as a hard film free from bubbles on the surface to which it is applied.

Example 13

A solution of about 100 parts of a polyester of diethylene glycol and adipic acid (1.3% OH) in about 150 parts of a solvent combination consisting of ethyl glycol acetate, butyl acetate, and xylene in the ratio of about 3:1:2 and about 15 parts of orthoformic acid ethyl ester are mixed with about 214 parts of about a 67% solution of a polyisocyanate prepared from about 3 mols of toluylene diisocyanate and about 1 mol of trimethylol propane in ethyl glycol acetate and xylene (1:1). After a short reaction time, about 20 parts of about a 20% solution of a copolymer of vinyl chloride and vinyl acetate in ethyl glycol acetate and cyclohexanone (3:1) and about 3 parts of about a 10% solution of a copolymer of acrylic acid butyl ester and vinyl isobutyl ether in ethyl glycol acetate are added. A clear, moisture drying one-component polyurethane lacquer is obtained. The tar solution described below is stirred into the clear lacquer. This tar solution consists of the following constituents and is obtained simply by mixing: about 300 parts of about an 80% tar solution in xylene as in Example 11, about 30 parts of cyclohexanone, about 9 parts of orthoformic acid ethyl ester and about 7.2 parts of a mixture of phosphorous pentoxide and magnesium oxide in a ratio of about 4:6.

A stable, moisture drying tar/polyurethane lacquer is obtained which has good technical lacquer properties and improved adhesion to metal. The ratio of tar to polyurethane is about 1:1.

Although the invention has been described in detail in the foregoing for the purpose of illustration, it is to be understood that such detail is solely for this purpose and that variations can be made by those skilled in the art in the foregoing embodiments without departing from the spirit and the scope of the invention except as set forth in the claims.

What is claimed is:

1. In the preparation of a polyurethane by reacting an organic polyisocyanate with a compound containing at least two active hydrogen atoms as determined by the Zerewitinoff method, the improvement which comprises stabilizing the reaction mixture against water with a mixture of phosphorous pentoxide and a member selected from the group consisting of pigments, fillers and mixtures thereof as a water binding agent the ratio of phosphorous pentoxide to the group member being from about 3:7 to about 1:1.

2. In the preparation of a polyurethane by reacting an organic polyisocyanate with a compound containing at least two active hydrogen atoms as determined by the Zerewitinoff method, the improvement which comprises stabilizing the reaction mixture against water with an effective amount of a mixture of phosphorous pentoxide and a member selected from the group consisting of zinc oxide, aluminum oxide, silicic acids, magnesium oxide, calcium oxide, and mixtures thereof as a water binding agent the ratio of phosphorous pentoxide to the group member being from about 3:7 to about 1:1.

3. The process of claim 3 wherein from about 1.2 to about 2.4% of the phosphorous pentoxide calculated on the materials to be dehydrated is used.

4. The process of claim 2 wherein the aluminum oxide is of a chromatographic grade.

5. The process of claim 1 wherein the polyisocyanate is reacted with the active hydrogen containing compound in a solvent solution.

6. The method of claim 1 wherein the polyisocyanate is reacted with the active hydrogen containing compound in a solvent-free reaction mixture.

7. The process of claim 1 wherein the stabilized polyurethane is a prepolymer prepared by reacting an excess of an organic polyisocyanate with an active hydrogen containing compound.

8. A method for stabilizing a polyurethane reaction mixture against water which comprises treating the components of the polyurethane reaction mixture which contain moisture with a mixture of phosphorous pentoxide and a member selected from the group consisting of zinc oxide, aluminum oxide, silicic acids, magnesium oxide, calcium oxide, and mixtures thereof as a water binding agent the ratio of phosphorous pentoxide to the group member being from about 3:7 to about 1:1, removing said water binding agent, and mixing the components together in a polyurethane reaction mixture.

9. A method for stabilizing a polyurethane reaction mixture against water which comprises treating the components of the polyurethane reaction mixture which contain moisture with a mixture of phosphorous pentoxide and a member selected from the group consisting of zinc oxide, aluminum oxide, silicic acids, magnesium oxide, calcium oxide and mixtures thereof as a water binding agent the ratio of phosphorous pentoxide to the group member being from about 3:7 to about 1:1, and mixing the components together in a polyurethane reaction mixture.

10. A water binding agent which comprises a mixture of phosphorous pentoxide and a member selected from the group consisting of zinc oxide, aluminum oxide, silicic acids, magnesium oxide, calcium oxide, and mixtures thereof the ratio of phosphorous pentoxide to the group member being from about 3:7 to about 1:1.

11. A water binding agent which comprises a mixture of phosphorous pentoxide and a member selected from the group consisting of zinc oxide, aluminum oxide, silicic acids, magnesium oxide, calcium oxide and mixtures thereof, in a ratio of phosphorous pentoxide to group member of from about 3:7 to about 1:1.

12. A polyurethane reaction mixture stabilized against the effects of water which comprises an organic compound having at least two reactive hydrogen atoms as determined by the Zerewitinoff method, an organic polyisocyanate and phosphorous pentoxide in admixture with a member selected from the group consisting of zinc oxide, aluminum oxide, silicic acids, magnesium oxide, calcium oxide and mixtures thereof in an amount sufficient to stabilize the reaction mixture against water, the ratio of phosphorous pentoxide to the group member being from about 3:7 to about 1:1.

References Cited

UNITED STATES PATENTS

| 3,164,558 | 1/1965 | Eichhorn | 260—2.5 |
| 3,239,474 | 3/1966 | Cwik | 260—37 |
| 3,337,491 | 8/1967 | Williamson | 260—37 |

FOREIGN PATENTS 979,272  1/1965  Great Britain.

MORRIS LIEBMAN, *Primary Examiner.*

L. T. JACOBS, *Assistant Examiner.*